(12) United States Patent
Jeon et al.

(10) Patent No.: US 7,649,830 B2
(45) Date of Patent: Jan. 19, 2010

(54) HYBRID TYPE CHANNEL ESTIMATION METHOD AND SYSTEM FOR MOBILE ENVIRONMENT

(75) Inventors: Won Gi Jeon, Pyungtaek (KR); Jeong Wook Seo, Pyungtaek (KR); Jung Wook Wee, Namyangju (KR); Dong Sun Kim, Incheon (KR); Youn Sung Lee, Gunpo (KR)

(73) Assignee: Korea Electronics Technology Institute (KR)

( * ) Notice: Subject to any disclaimer, the term of this patent is extended or adjusted under 35 U.S.C. 154(b) by 669 days.

(21) Appl. No.: 11/107,969

(22) Filed: Apr. 18, 2005

(65) Prior Publication Data
US 2005/0286406 A1    Dec. 29, 2005

(30) Foreign Application Priority Data
Jun. 28, 2004    (KR) ................. 10-2004-0048909

(51) Int. Cl.
*H04J 11/00*    (2006.01)
*H04L 27/28*    (2006.01)
*H04L 5/12*    (2006.01)

(52) U.S. Cl. ................. 370/203; 370/207; 370/208; 375/260; 375/261

(58) Field of Classification Search ................. 370/208, 370/203, 210, 207, 211
See application file for complete search history.

(56) References Cited

U.S. PATENT DOCUMENTS

| | | | |
|---|---|---|---|
| 6,834,043 B1 | 12/2004 | Vook et al. | |
| 7,039,001 B2 * | 5/2006 | Krishnan et al. | 370/203 |
| 7,139,321 B2 * | 11/2006 | Giannakis et al. | 375/260 |
| 7,321,564 B2 * | 1/2008 | Ikram et al. | 370/252 |
| 7,359,445 B2 * | 4/2008 | Kenney et al. | 375/261 |
| 2004/0072594 A1 | 4/2004 | Hwang et al. | |
| 2004/0208254 A1 | 10/2004 | Lee et al. | |
| 2005/0002472 A1 * | 1/2005 | Lee et al. | 375/316 |
| 2007/0019748 A1 * | 1/2007 | Hoo et al. | 375/260 |

OTHER PUBLICATIONS

Minjoong Rim, Optimally combining decision directed and pilot symbol aided channel estimators, Electronic letters,IEEE, Mar. 20, 2003, vol. 39 No. 6, pp. 558-559.*

(Continued)

*Primary Examiner*—Chi H Pham
*Assistant Examiner*—Farah Faroul
(74) *Attorney, Agent, or Firm*—Edell, Shapiro & Finnan, LLC

(57) ABSTRACT

Disclosed herein is a hybrid channel estimation method and system for an Orthogonal Frequency Division Multiplexing (OFDM) wireless communication system. The hybrid channel estimation method includes the steps of acquiring a first channel coefficient using decision-directed channel estimation; acquiring a second channel coefficient using pilot-symbol-aided channel estimation; and calculating the final channel coefficient of a received signal by multiplying the first and second coefficients by first and second multiplication coefficients, respectively, and adding the multiplication results. The step of acquiring the first channel coefficient using the decision-directed channel estimation includes the steps of acquiring an initial channel coefficient by processing a long training symbol using a Least Square (LS) method; generating data by equalizing, demodulating and modulating a fast Fourier transformed new symbol using a previously estimated channel coefficient; and acquiring a new channel coefficient by dividing the new symbol by the data.

16 Claims, 8 Drawing Sheets

OTHER PUBLICATIONS

Li, Pilot symbol aided channel estimation for OFDM in wireless systems, Ye Li, IEEE vol. 49, No. 4, Jul. 2000, p. 1207-1215.*

Lee et al, Channel estimation with power controlled pilot symbols and decision directed reference symbols, IEEE, 2003.*

Ran et al, Decision Directed Channel Estimation Method for OFDM systems with High velocities, IEEE, 2003,pp. 23582361 Wookwon Lee, Channel Estimation with power controlled pilot symbols and decision directed reference symbols, IEEE, 2003.*

* cited by examiner

[FIG. 2]

[FIG. 5]
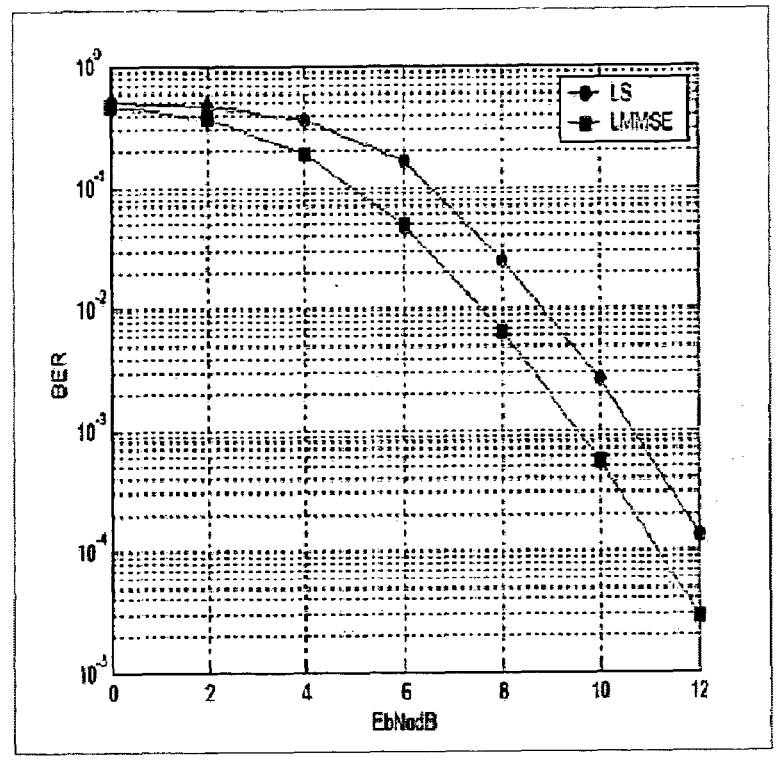
[FIG. 6]
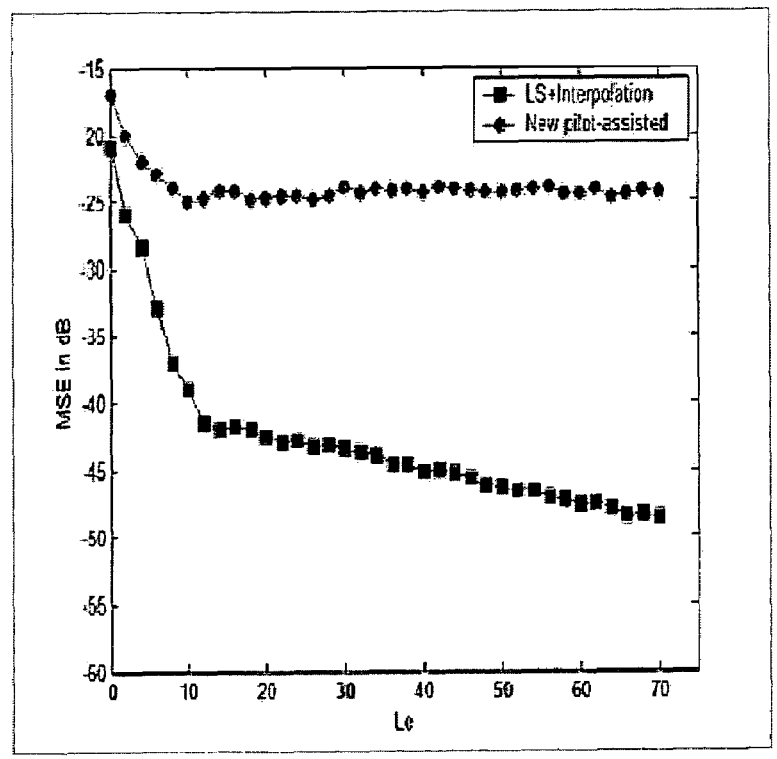

[FIG. 7]
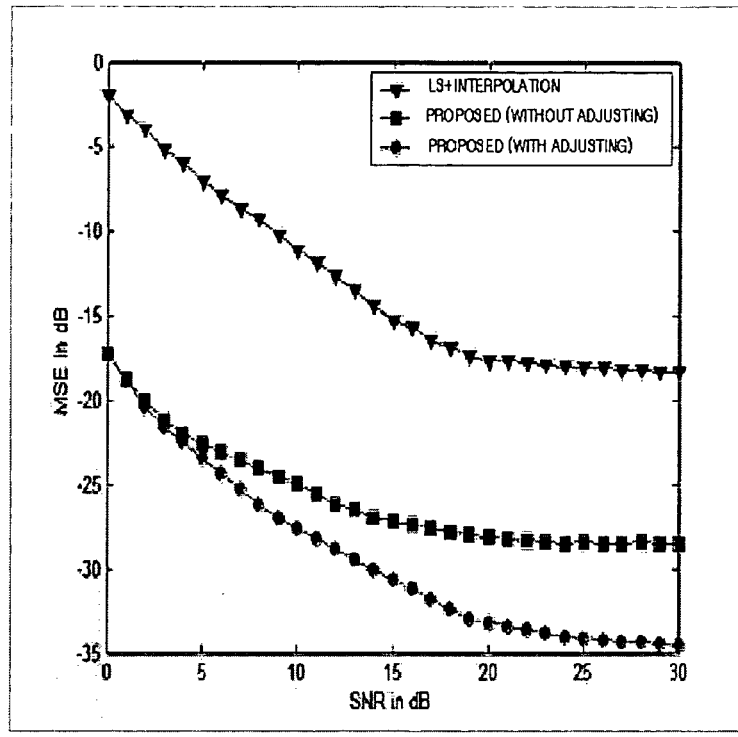
[FIG. 8a]
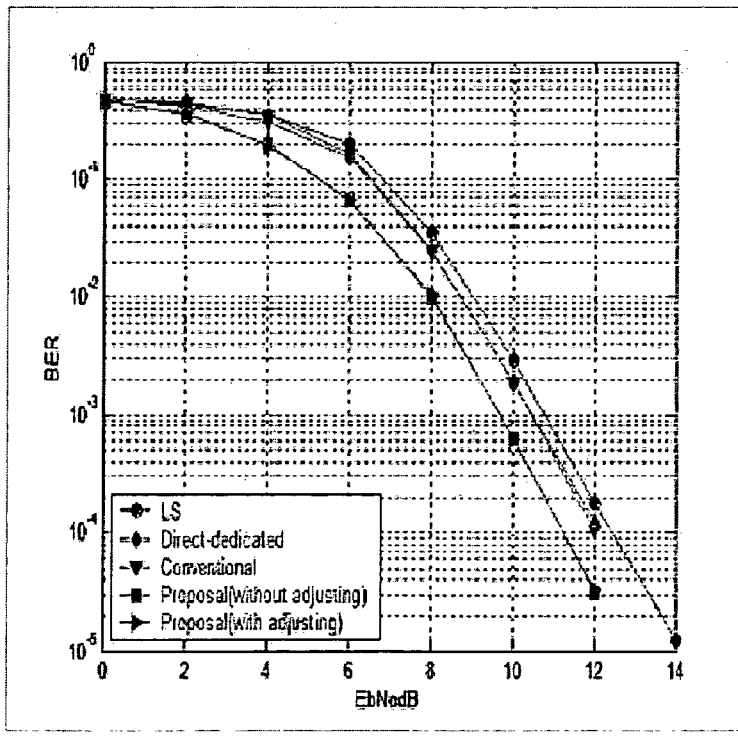

[FIG. 8b]
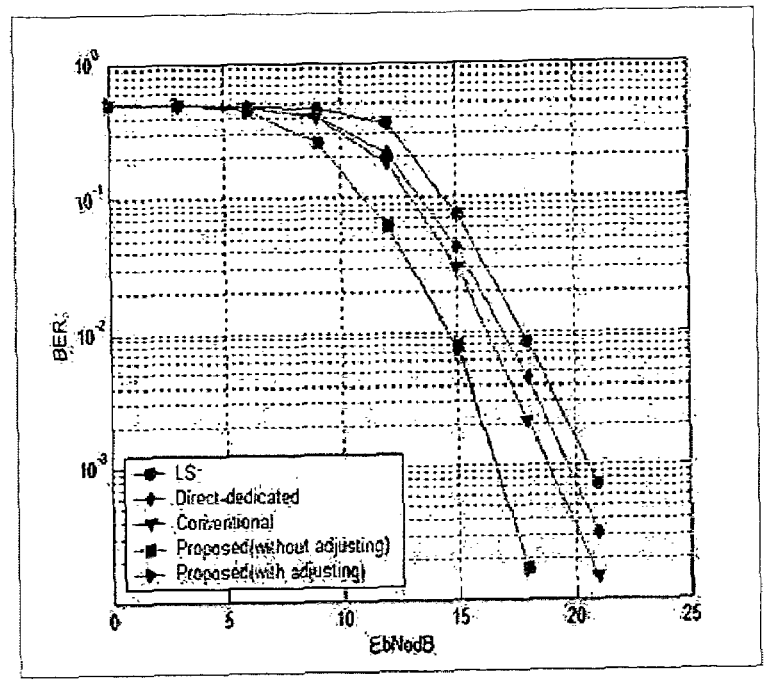
[FIG. 9a]
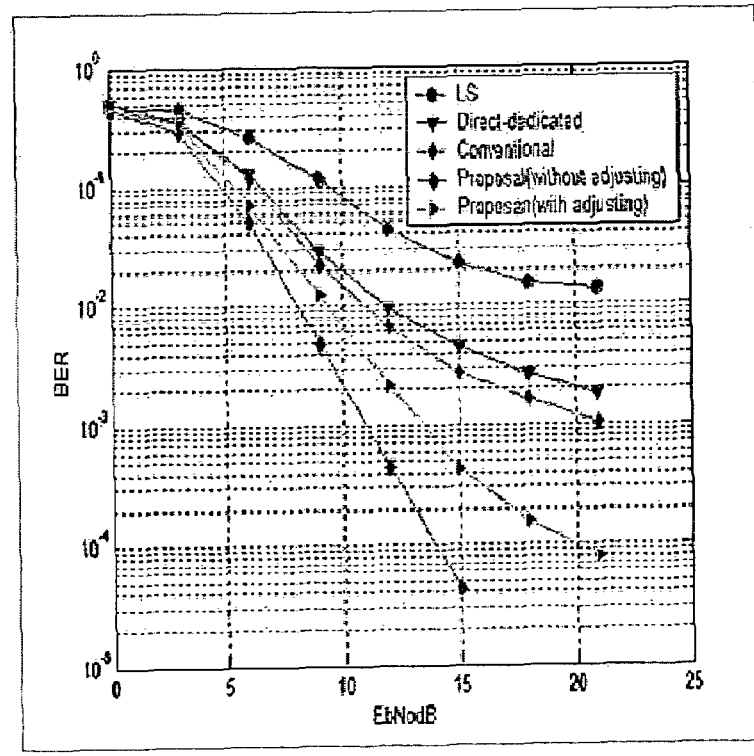

[FIG. 9b]
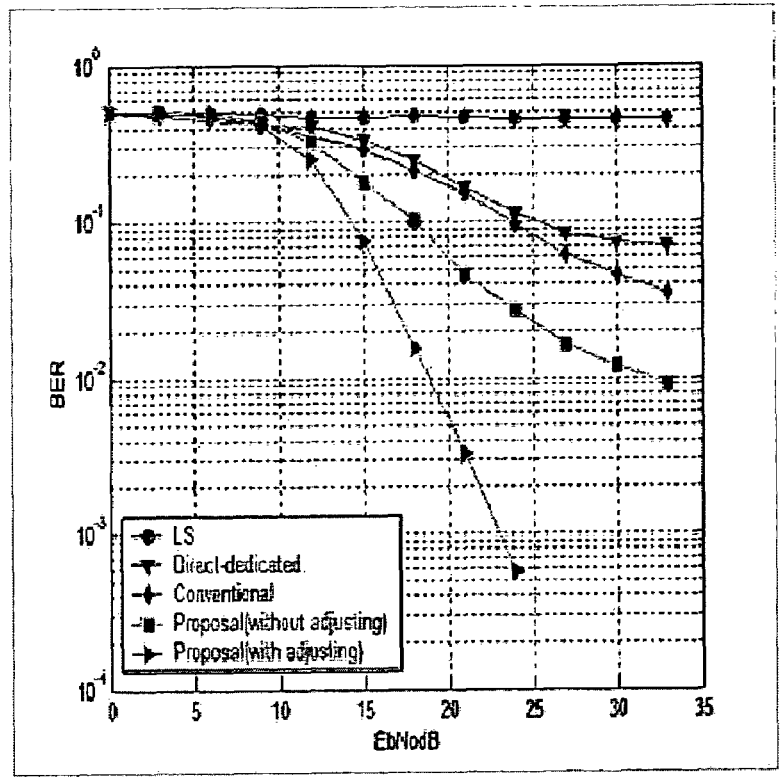
[FIG. 10]
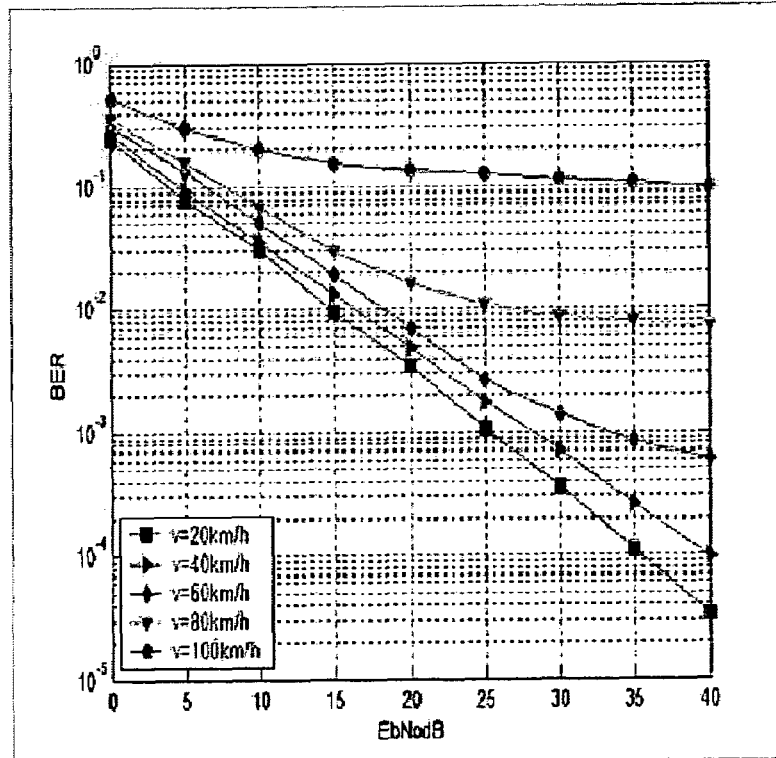

7,649,830 B2

HYBRID TYPE CHANNEL ESTIMATION METHOD AND SYSTEM FOR MOBILE ENVIRONMENT

RELATED APPLICATIONS

The present disclosure relates to subject matter contained in priority Korean Application No. 10-2004-0048909, filed on 28 Jun. 2004, which is herein expressly incorporated by reference in its entirety.

BACKGROUND OF THE INVENTION

1. Field of the Invention

The present invention relates generally to a wireless communication system and, more particularly, to an orthogonal frequency division multiplexing channel estimation method and system in a time-varying environment in which a transmitter and/or receiver moves at high speed.

2. Description of the Related Art

Finite communication bandwidth is a significant limitation of the capacity of wireless communication systems. Accordingly, in order to increase the wireless communication capacity of the wireless communication systems, orthogonal transmission methods, such as Orthogonal Frequency Division Multiplexing (OFDM), have been developed to modulate information onto orthogonal subcarriers and transmit the modulated signal.

OFDM is a broadband modulation method of dividing a frequency bandwidth allocated for a communication session into a plurality of narrow frequency subbands, in which each of the subbands includes a Radio Frequency (RF) sub-carrier and each of the subcarriers is mathematically orthogonal to RF subcarriers included in the other sub-channels. The orthogonality of the subcarriers allows their spectra to overlap each other without interference with the other subcarriers. Accordingly, the OFDM has a high data transmission rate and very efficient use of bandwidth is possible because the bandwidth is divided into a plurality of orthogonal subbands.

FIG. 1 is a block diagram illustrating an example of a conventional OFDM communication system 100. The OFDM communication system 100 includes a transmission side 102 through 118 and a reception side 112 through 136.

On the transmission side, a data transmission unit 102 inputs data, which is generally a bitstream, to an encoder 104. The encoder 104 applies error correction code (generally, forward error correction code) to the bitstream, and transfers the encoded bitstream to a symbol mapper 106. The symbol mapper 106 divides the bitstream into groups of P bits (P-tuples) and then maps each P-tuple to one symbol which is chosen from M constellation points to generate a next symbol stream. In this case, $M=2^P$, and each symbol is represented as one point selected form a group of points in multi-dimensional modulation. Generally, two-dimensional modulation, such as Multiple Phase Shift Keying (MPSK) or Multiple Quadrature Amplitude Modulation (MQAM), is used as a symbol mapping scheme.

The symbol mapper 106 transfers the symbol stream to a Serial-Parallel (S/P) converter 108, such as an inverse multiplexer. The S/P converter 108 converts the symbol stream from a serial form to a parallel form, and applies the output of N parallel symbols to an orthogonal modulator 110, such as an Inverse Fast Fourier Transform (IFFT) block that is a fast form of an Inverse Discrete Fourier Transform (IDFT). In order to generate N parallel-modulated subcarriers, the orthogonal modulator 110 modulates each of the N subcarriers using one of the N symbols. In this case, each subcarrier is orthogonal to the other subcarriers. Thereafter, the N modulated subcarriers are transferred from the orthogonal modulator 110 to a Parallel-Serial (P/S) converter 112, such as a multiplexer for combining the N modulated subcarriers together, to generate an output signal 113. The P/S converter 112 transmits the output signal 113 to a Cyclic Prefix (CP) adder 114 that adds a guard band interval or cyclic prefix to the signal 113 to generate an output signal 115. Thereafter, the output signal 115 is transferred to a frequency up-converter 116 that converts the output signal 115 from a baseband frequency to a transmission frequency. The frequency up-converted signal is transferred to a Power Amplifier (PA) 118 that amplifies the signal and transmits the amplified signal through an antenna.

The reception side 120 through 136 implements a function inverse to that of the transmission side 102 through 118. A received signal is transmitted to a Low Noise Amplifier (LNA) 120 that amplifies the received signal, and then the amplified signal is transferred to a frequency down-converter 122 that converts the amplified signal from a transmission frequency to a baseband frequency. Thereby, the frequency down-converter 122 outputs a baseband signal. The baseband signal is transferred to a CP eliminator 124 that eliminates the cyclic prefix added to the baseband signal. The CP eliminator 124 transfers a cyclic prefix-free signal to an S/P converter 126. The S/P converter 126 converts the frequency down-converted prefix-free signal from a serial form to a parallel form, and outputs N parallel-modulated subcarriers. The N parallel-modulated subcarriers are transferred to an orthogonal demodulator 128, such as a Discrete Fourier Transform (DFT) or Fast Fourier Transform (FFT) block, that demodulates transmitted information based on the N orthogonal functions that are used in the orthogonal modulator 110. The output of the orthogonal demodulator 128 includes N parallel symbols corresponding to the N modulated subcarriers, which are transmitted to a P/S converter 130. The P/S converter 130 converts the symbols from a parallel form to a serial form to generate a symbol stream, and transfers the generated symbol stream to an inverse symbol mapper 132. The inverse symbol mapper 132 generates a bitstream by restoring the P-tuples corresponding to each of the symbols, based on the symbol mapping rule or scheme used by the symbol mapper 108. Thereafter, the inverse symbol mapper 132 transmits the restored bitstream to a decoder 134. The decoder 134 decodes the bitstream based on the error correction code that has been applied by the encoder 104, and transfers the decoded bitstream to a data reception unit 136.

The key to the bandwidth efficiency of the OFDM system is the orthogonality of the subcarriers. In order to maintain the orthogonality of the subcarriers, the OFDM system adds the guard band interval having a time length Tg, which is designated as a cyclic prefix, to each of the OFDM symbols. Accordingly, since the transmitted OFDM symbol can be generally regarded as including two intervals, that is, the guard band interval Tg and an OMDM symbol interval Ts, the total period of the transmitted symbol is Ttotal=Tg+Ts. In the other hand, the use of the guard band interval or the cyclic prefix reduces spectrum efficiency because additional time is spent due to the repeated parts of information. Therefore, the length of the guard band interval should be limited.

However, in order to eliminate interference between symbols (a symbol transmitted through a subband interferes with the following symbol transmitted through the same subband), the guard band interval should be lengthened by at least a period corresponding to multipath delay or fading caused in a system by a propagation environment.

In a wireless communication system, it is difficult to predict the multipath delay. The mutipath delay in such a system is a random variable, and there are some cases where the mutipath delay is longer than the predetermined length of the cyclic prefix, in the wireless communication system.

That is, the OFDM system for packet-based transmission uses relatively short OFDM symbols to perform high-speed data transmission, but, in the case of a communication system in a high-speed mobile environment such as a vehicle or a train, there occurs a case in which a transmitted signal goes beyond the assumption of a time-invariant channel characteristic and experiences fading in terms of time or frequency. In this case, the time variation of a channel cannot be ignored. Accordingly, in such a case, Channel State Information (CSI) acquired from packet headers (long training symbols) cannot be trusted. If a symbol period is not sufficiently long, a channel in each subcarrier band experiences frequency selective fading and, therefore, CSI acquired by interpolating pilot symbols inserted into a data symbol can not be trusted.

SUMMARY OF THE INVENTION

Accordingly, the present invention has been made keeping in mind the above problems occurring in the prior art, and an object of the present invention is to provide a method and system for increasing the accuracy of estimated CSI in an OFDM based packet transmission system.

In order to accomplish the above object, the present invention provides a hybrid channel estimation method in an OFDM communication system, including the steps of acquiring a first channel coefficient using decision-directed channel estimation; acquiring a second channel coefficient using pilot-symbol-aided channel estimation; and calculating the final channel coefficient of a received signal by multiplying the first and second coefficients by first and second multiplication coefficients, respectively, and adding the multiplication results.

The core technical spirit of the present invention is to apply hybrid type direct-dedicated channel estimation, which is processed in time and frequency domains, to channel estimation, so as to extract precise CSI information having high reliability in a high-speed environment.

In a high-speed wireless communication system, the problem of interference between symbols caused by the distortion of channels is serious and, therefore, the equalizer of a receiver is complicated. Accordingly, recent systems prefer Code Division Multiple Access (CDMA) or OFDM method in which the problem of interference between symbols does not occur. The CDMA technique is capable of identifying multiple paths in a delay spread, and the OFDM technique avoids the interference between symbols by dividing a single carrier into a plurality of subcarriers and therefore lengthening a symbol interval compared to the delay spread. However, a complicated equalizer is not required even in the case in which the CDMA or the OFDM technique is used, but the channel estimation and the channel compensation of a single tap equalizer type that compensates for the distortion of a signal due to a channel are required.

Channel algorithms are classified into two types: pilot-symbol-aided channel estimation and decision-directed channel estimation. The pilot-symbol-aided channel estimation is a method of periodically interposing a predetermined signal, which is called a pilot, between data and estimating a channel using the interposed pilot. In contrast, the decision-directed channel estimation is a method of reducing the noise variance of a channel estimation value using general data as well as a pilot symbol. Both of the algorithms are useful in obtaining a high quality channel estimation value by using adjacent channel values with high correlation and passing the adjacent channel values through a filter to reduce the noise variance of the channel estimation value.

Meanwhile, the size of a filter in a channel estimator is generally determined using the velocity estimation of a moving object. The factor for determining the size is not limited to a Doppler frequency related to velocity. The pilot-symbol-aided channel estimation is a method of obtaining an instant channel estimation value by dividing a received signal by a transmitted signal. Since the instant channel estimation has large noise variance, more precise estimation can be obtained using a filter. In the case of the pilot-symbol-aided channel estimation, the size of the filter is determined by the signal to noise ratio and the variation rate of a channel. The value of the noise variance is reduced in proportion to the size of the filter, and a component relating to channel variation increases as the size of the filter increases. Accordingly, the size of the filter should be determined by selecting the point at witch the variance of an estimated channel value is minimized.

The decision-directed channel estimation is a method of using decision data as pilot data. Since a decision error in the decision-directed channel estimation influences the variance of an estimated channel value when the decision error occurs, the optimal size of the filter cannot be determined merely by considering a signal to noise ratio and the variation rate of a channel. Accordingly, the optimal filter size should be determined by considering the signal to noise ratio and the variation rate of a channel along with a probability of the decision error.

BRIEF DESCRIPTION OF THE DRAWINGS

The above and other objects, features and advantages of the present invention will be more clearly understood from the following detailed description taken in conjunction with the accompanying drawings, in which:

FIG. 5 is a view illustrating the comparison results of the cases to which a linear minimum mean square error method and the least square method are applied, to show the effect of the channel estimation method of the present invention;

FIGS. 6 and 7 are views illustrating the results of pilot-symbol-aided channel estimation according to the present invention;

FIGS. 8a and 8b are views illustrating to represent the bit error rate performance of channel estimation of the present invention in a joint technical committee channel model in which a root means square is 100 ns;

FIGS. 9a and 9b are views illustrating the bit error rate performance of channel estimation of the present invention in a joint technical committee channel model in which a root means square is 150 ns; and FIG. 10 is a view illustrating the bit error rate performance of channel estimation of the present invention according to a velocity in a Jakes' fading channel.

DESCRIPTION OF THE PREFERRED EMBODIMENTS

Figure 1:
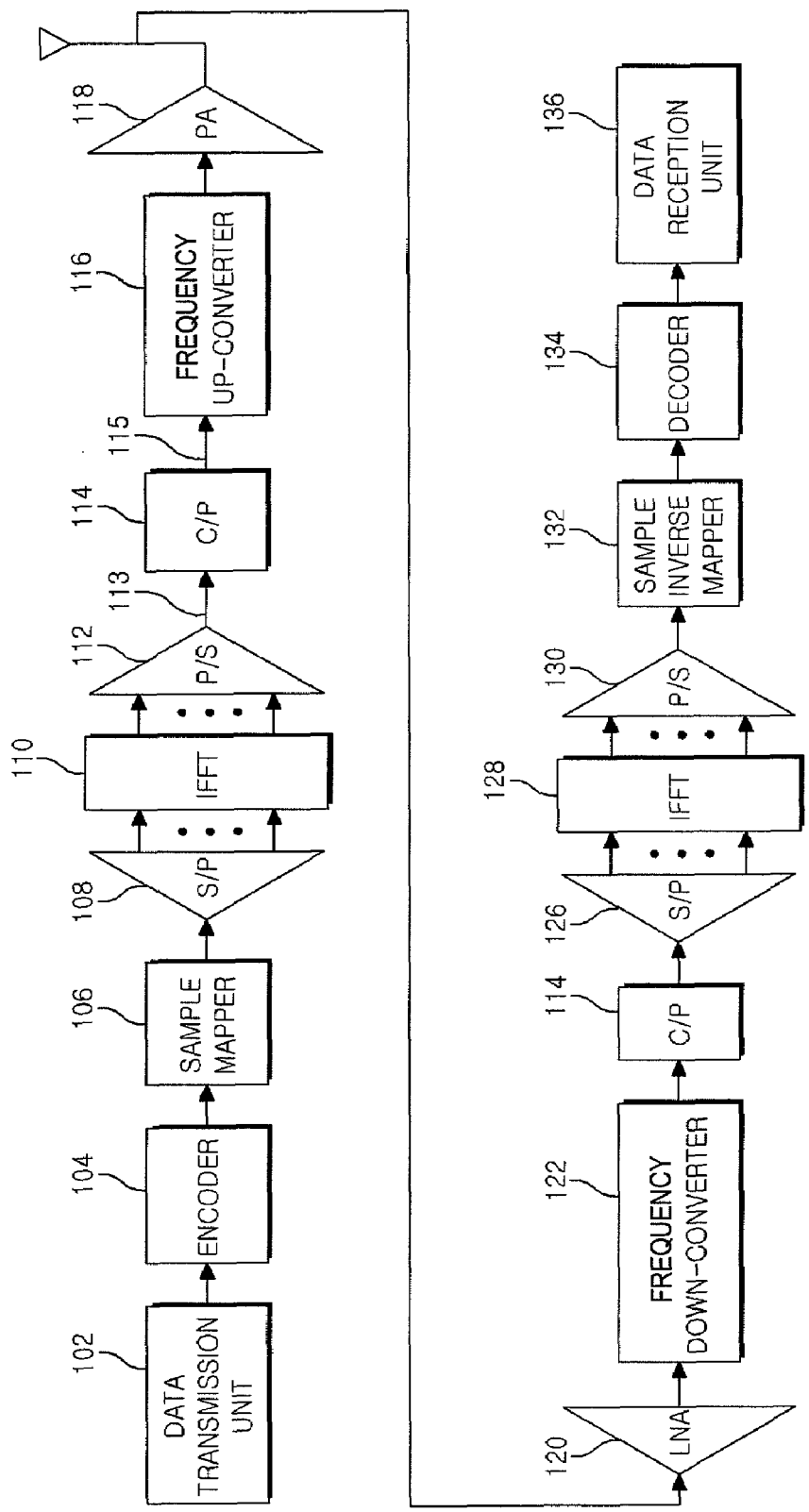
FIG. 1 is a block diagram illustrating the construction of a conventional OFDM transmitter and receiver.
Figure 2:
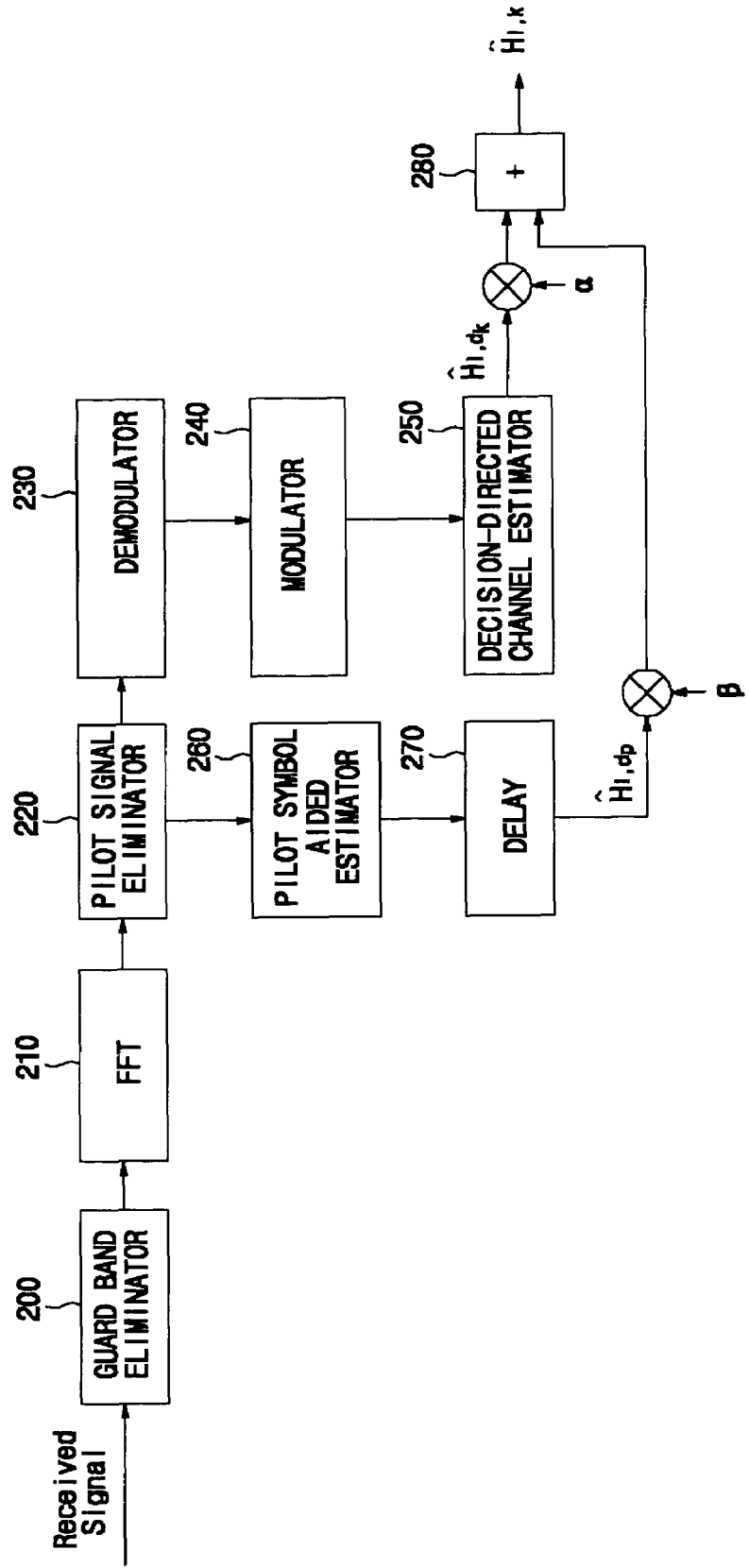
FIG. 2 is a block diagram illustrating the construction of a channel estimator according to the present invention.

The construction of the present invention is described in detail with reference to the accompanying drawings below. FIG. 2 is a block diagram illustrating a channel estimator according to the present invention.

A received signal is input to an FFT processor 210 through a guard band interval eliminator 200, and a signal from the FFT processor 210 passes through a pilot signal eliminator 220, a demodulator 230 and a modulator 240, and is processed for channel estimation in a channel estimator 250. The result of the channel estimation is multiplied by α and is then input to an adder 280. At the same time, the signal having passed through the FFT processor 210 passes through the pilot signal eliminator 220, a pilot-symbol-aided channel estimator 260, and a delay 270. Thereafter, the result of the channel estimation is multiplied by β and is transmitted to the adder 280. An output value from the adder 280 is an estimated channel value calculated using both decision-directed estimation and pilot-symbol-aided channel estimation.

That is, a channel estimation method according to the present invention employs both the decision-directed channel estimation and the pilot-symbol-aided channel estimation to acquire more precise CSI. In this case, the pilot-symbol-aided channel estimation using a limited number of pilot symbols in each OFDM symbol is used to cope with the time-varying characteristic of a channel. In contrast, the decision-directed channel estimation is used to overcome the frequency selectivity of a channel.

The decision-directed channel estimation applied to the front portion of a packet sets an initial value to channel information that is acquired by applying a Least Square (LS) method to a long training symbol, and updates the channel information using a decision data symbol. A Linear Minimum Mean Square Error (LMMSE) method is used to acquire further precise channel coefficients. The pilot-symbol-aided channel estimation accumulates and averages channel estimation values, which are acquired using the LS method at the locations of a pilot symbols, to cope with the case in which the maximum time delay exceeds the guard band interval, and performs linear interpolation to acquire channel coefficients. This value is IFFT-transformed, and time delay exceeding the guard band interval is estimated from the inversely transformed value. Thereafter, the estimated value is updated to approximate actual channel coefficients.

The channel estimation result, to which both the decision-directed channel estimation and pilot-symbol-aided channel estimation have been applied, is expressed by the following Equation 1.

$$\hat{H}_l(k) = \alpha \hat{H}_{l,d_k} + \beta \hat{H}_{l,d_p} \quad (1)$$

where α and β are decision coefficients, which are described in detail below.

<Decision-Directed Channel Estimation>

Figure 3:
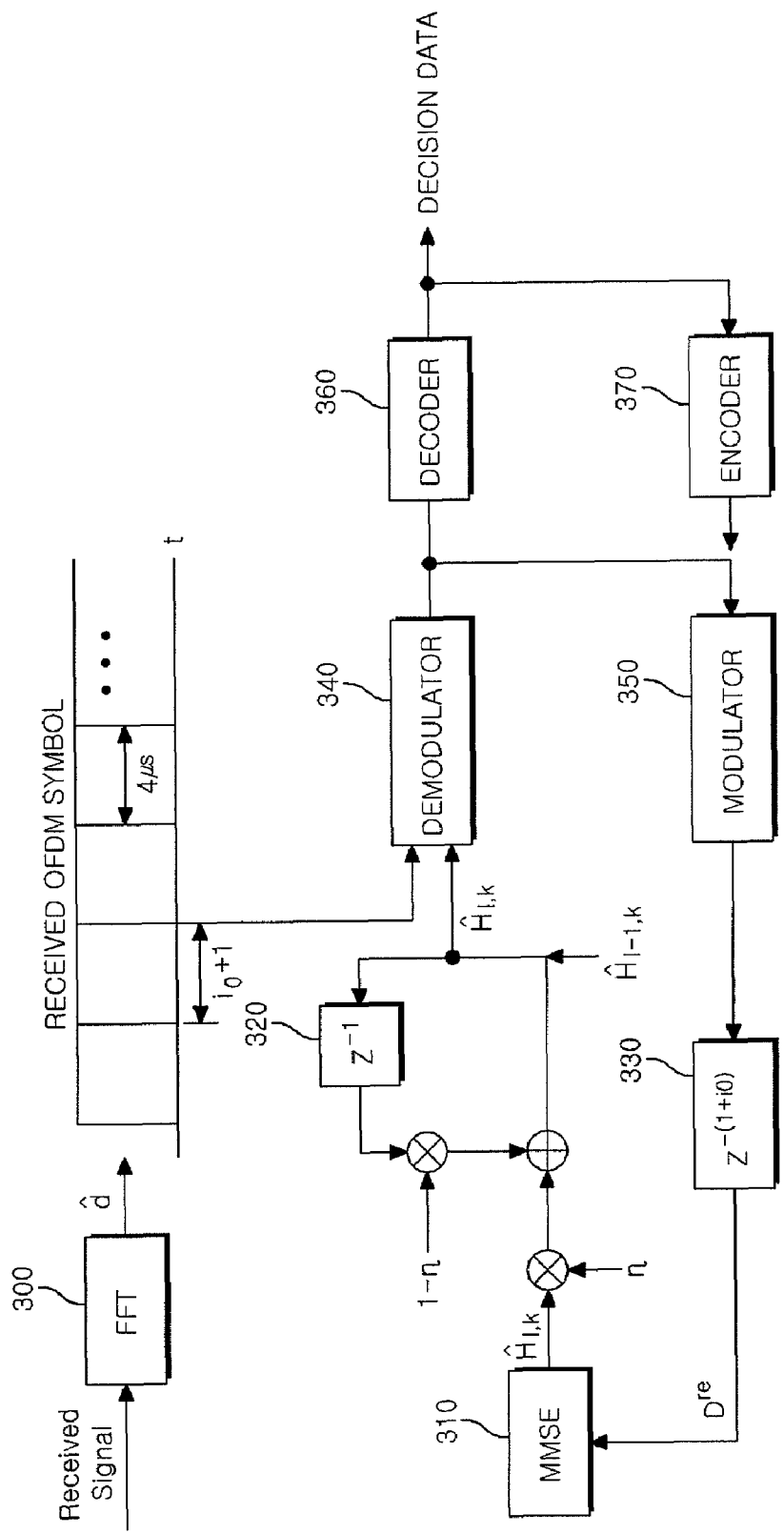
FIG. 3 is a block diagram illustrating a channel estimator to which a decision-directed method is applied, according to the present invention.

With reference to FIG. 3, the decision-directed channel estimation is described in more detail below. Data $\hat{R}_{l,k}$ received through an FFT 300 is equalized by a channel coefficient $\hat{H}_{l-1,k}$ that is estimated by a previous symbol, according to the following Equation 2.

$$\hat{d}_{l,k} = \frac{R_{l,k}}{\hat{H}_{l-1,k}} \quad (2)$$

Data $d^{re}$ is generated when an equalized symbol $\hat{d}_{l,k}$ is demodulated in a demodulator 340 and is then modulated in a modulator 350. The received symbol $\hat{R}_{l,k}$ is divided by the data $d^{re}$ as indicated in the following Equation 3, to obtain a new channel coefficient $\hat{H}_{l,k}$, and is then passed through a Minimum Mean Square Error (MMSE) block to reduce the influence of noise.

$$\hat{H}_{l,k} = \frac{R_{l,k}}{d^{re}} \quad (3)$$

In the case in which an error exists in the decision data symbol, performance is degraded. Accordingly, to prevent the performance from being degraded, the channel coefficient that has been previously estimated is used along with the new channel coefficient as indicated in the following Equation 4.

$$\hat{H}_{l,k} = \eta \cdot \hat{H}_{l,k} + (1-\eta) \cdot \hat{H}_{l-1,k} \quad (4)$$

<Decision of Update Factor (η) in Decision-Directed Estimation>

The update factor (η) of Equation (4) is decided on as follows.

It is assumed that received data R is a random variable that is interfered with noise w(0, σ²) and a channel H.

$$R = D \cdot H + W, \text{ (where D is a data set)} \quad (5)$$

On such an assumption, the Probability Density Function (PDF) of R is as follows.

$$p(R|D) = \frac{1}{\sqrt{2\pi}\sigma} \exp\left(-\frac{1}{2\sigma^2}|R - S \cdot H|^2\right) \quad (6)$$

(where S is a recieved signal)

In Multilevel Quadrature Amplitude Modulation (M-QAM), $D_m$ (m=1, 2, ..., M) are decided from a finite alphabet set d. Assuming that all symbols Dm are uniformly distributed in the transmission unit, the posterior probability of $d^{re}$ is represented by the following equation 7 based on a prior probability formula and Bay's theorem.

$$p(d^{re}|R) = \frac{p(R|d^{re})}{\sum_m p(R|D_m)} = \frac{\exp\left(-\frac{|H|^2}{2\sigma^2} \cdot |\hat{d} - d^{re}|^2\right)}{\sum_m \exp\left(-\frac{|H|^2}{2\sigma^2} \cdot |\hat{d} - d^{re}|^2\right)} \quad (7)$$

The above-described Equation 7 indicates that a measured symbol has the greatest posterior probability in an alphabet set d.

$$\frac{1}{M} \leq p(d^{re}|R) \leq 1 \quad (8)$$

(where M is the greatest number in the finite data set)

The update factor η (0<η<$\eta_{max}$) generated from a cyclic filter indicates the quality of a demodulated symbol (that is, the reliability of channel estimation for a received symbol). Since p($d^{re}$|R) and η are not uniformly distributed in the range of [0, $\eta_{max}$], the normalized factor η is calculated in the decision-directed channel estimation as indicated by the following Equation 9.

$$\eta = \eta_{max}\left[\frac{p(d^{re}|R) - 1/M}{1 - 1/M}\right]^{\alpha} \quad (9)$$

In Equation 9, α is the level value of a signal to be estimated, which can be obtained by squaring the output value of a correlator that divides the signal to be estimated by a reference value.

$$\gamma = \sum_{m=0}^{k-1} d(n-m) \cdot d^*(n-m-k) \quad (10)$$

$$\alpha = \sqrt{Z(n)/\gamma}$$

where k is the length of an OFDM signal, n is a subcarrier number, m is the total number of subcarriers, and α is a multiplication coefficient by which the result of the decision-directed channel estimation is multiplied when the results of the decision-directed channel estimation and pilot-symbol-aided channel estimation are combined.

<LS Channel Estimation>

Figure 4:
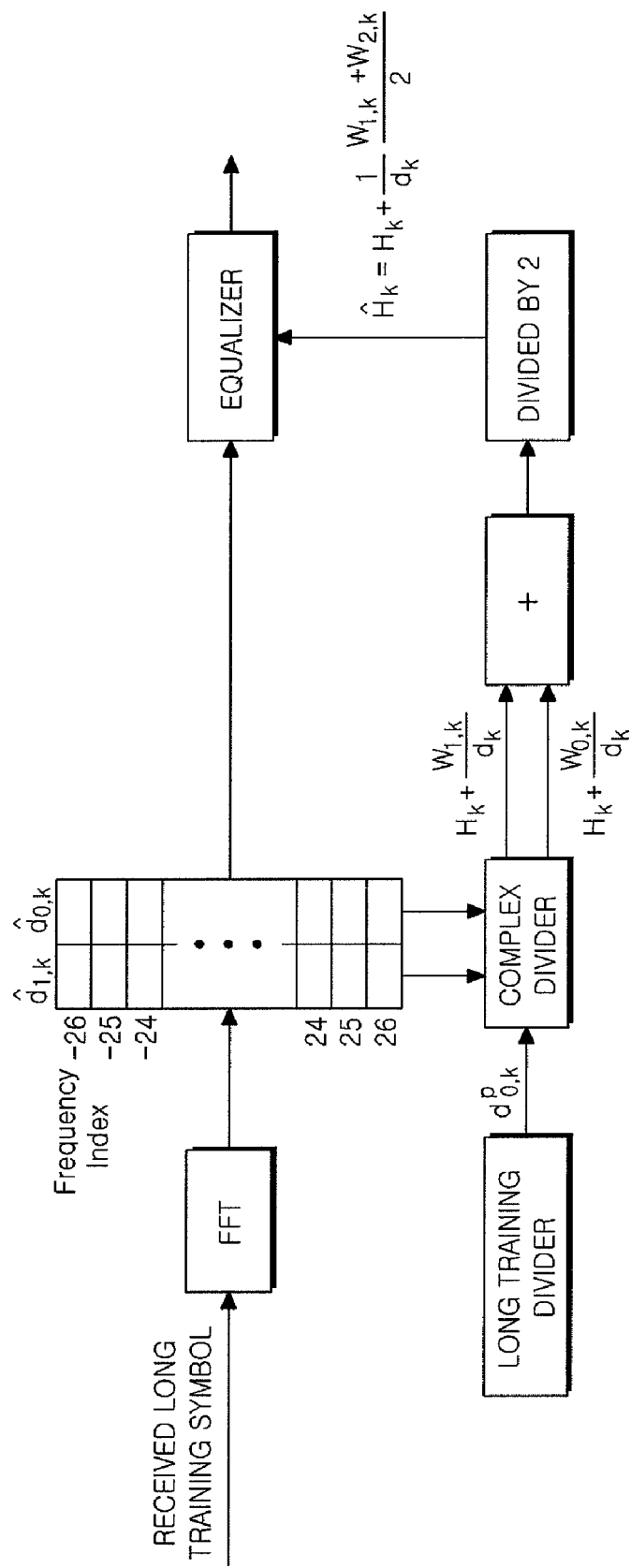
FIG. 4 is a functional block diagram illustrating a configuration for performing a least square method in a channel estimator according to the present invention.

As described above, the decision-directed channel estimation according to the present invention sets an initial value to the channel information that is obtained by processing the long training symbol using the LS method first, and updates the channel information using the decided data symbol. With reference to FIG. 4, the LS method is described in detail below.

A received long training symbol $R_{l,k}$ (l=0,1) that has passed through the FFT block is expressed in a form in which a noise $W_{l,k}$ is added to a product of a transmitted long training symbol $d_{l,k}$ and a channel $H_{l,k}$.

$$R_{l,k} = H_{l,k} d_{l,k} + W_{l,k} \quad (11)$$

where the channel estimation using the long training symbol is performed according to the following Equation 12.

$$\hat{H}_k = \frac{1}{2}(R_{0,k} + R_{1,k})\frac{1}{d_k} \quad (12)$$

$$= \frac{1}{2}(H_k d_k + W_{0,k} + H_k d_k + W_{1,k})\frac{1}{d_k}$$

$$= H_k |d_k|^2 + \frac{1}{d_k}\frac{(w_{0,k} + W_{1,k})}{2}$$

$$= H_k + \frac{1}{d_k}\frac{(w_{0,k} + W_{1,k})}{2}$$

Since noises $W_{0,k}$ and $W_{1,k}$ are independent of each other, the variance value of $$\frac{(W_{0,k} + W_{1,k})}{2}$$

is half the variance value of each noise sample.

<LMMSE Method>

In the decision-directed channel estimation, an LMMSE block for reducing a noise component is as follows.

$$\hat{H}_{lmmse} = R_{HH_{ls}} R_{H_{ls}H_{ls}}^{-1} \hat{H}_{ls} \quad (13)$$

$$= R_{HH}\left(R_{HH} + \sigma^2(XX^H)^{-1}\right)^{-1} \hat{H}_{ls}$$

where $$\hat{H}_{ls} = X^{-1}Y\left[\frac{Y(0)}{X(0)} \frac{Y(1)}{X(1)} \frac{Y(N-1)}{X(N-1)}\right]^T,$$

$\sigma_n^2$: the variance of noise covariance matrices $R_{HH} = E\{HH^H\}$ $R_{HH_{ls}} = E\{HH_{ls}\}$ $R_{H_{ls}H_{ls}} = E\{H_{ls}H_{ls}\}$ The LMMSE channel estimation is highly complex because a reverse matrix is required whenever the X value varies.

However, the complexity of the estimation can be reduced by averaging transmission data $((XX^H)^{-1} \to E(XX^H)^{-1})$. Assuming that all subcarriers have the same signal constellation and all constellation locations have the same probability value, the part $E(XX^H)^{-1}$ can be converted into $E[1/x_k]^2 I$. If an average Signal to Noise Ratio (SNR) is defined as $E[x_k]^2/\sigma_n^2$, the LMMSE channel estimation is simplified as indicated by the following Equation 14.

$$\hat{H}_{lmmse} = R_{HH}\left(R_{HH} + \frac{\beta}{SNR}I\right)^{-1}\hat{H}_{ls} \quad (14)$$

where $\beta = E[x_k]^2 E[1/x_k]^2$ is a constant value depending on the signal constellation, and the values of β according to individual modulation schemes are given in the following Table 1.

TABLE 1

| Modulation scheme | Value of β |
|---|---|
| BPSK | 1 |
| QPSK | 1 |
| 16-QAM | 1.8889 |
| 64-QAM | 2.6854 |

Since X is not a factor required for matrix calculation, it is not necessary to obtain the inverse matrix whenever X varies. If $R_{HH}$ and the SNR are decided on as fixed values, a matrix $$R_{HH}\left(R_{HH} + \frac{\beta}{SNR}I\right)^{-1}$$

is calculated only once at first.

<Pilot-Symbol-Aided Channel Estimation>

The channel estimation according to the present invention is achieved by combining the decision-directed channel estimation and the pilot-symbol-aided channel estimation. The pilot-symbol-aided channel estimation is described in detail below.

If the guard band interval is relatively short compared to the maximum delay time, Inter Symbol Interference (ISI) and Inter Channel Interference (ICI) occur. A pilot symbol $\hat{R}_{l,p}$ received under such conditions is as follows.

$$\hat{R}_{l,p} = \hat{R}_{l,p}^U + \hat{R}_{l,p}^{ICI-CIG} + \hat{R}_{l,p}^{ICI-CTC} + \hat{R}_{l,p}^{ISI} \quad (15)$$

where $\hat{R}_{l,p}{}^U$ is a valuable part, $\hat{R}_{l,p}{}^{ICI-CTC}$ is an ICI component caused by an inefficient guard band interval, $\hat{R}_{l,p}{}^{ICI-CTC}$ is an ICI component caused by the time variation of a channel, and $\hat{R}_{l,p}{}^{ISI}$ is an ISI component.

$\hat{R}_{l,p}{}^U$, that is, a first valuable part, can be expressed as follows.

$$\hat{R}_{l,p}{}^U = D_{l,p}\{H_1(p) + \alpha H_2(p) + \rho_p\} \tag{16}$$

where $H_1(p)$ ($h_1(k)$, $k=0, 1, \ldots, G-1$) is a channel coefficient within the guard band interval, and $H_2(p)$ ($h_2(k)$, $k=G, \ldots, N_{FFT}-1$) is a channel coefficient within the data symbol. Accordingly, the Equation 15 is concluded as follows.

$$\hat{R}_{l,p} = D_{l,p}\{H_1(p) + \alpha H_2(p) + \eta_p\} + \hat{R}_{l,p}{}^{ICI-CIG} + \hat{R}_{l,p}{}^{ISI},$$

$$\hat{R}_{l,p} = DH(p) + \overline{d_{l}H_p}{}^{ICI-CIG} + \overline{d_{l-1}H_p}{}^{ISI}, \text{ and}$$

$$\hat{R}_{l,p} = DH(p) + \hat{R}_{l,p}{}^c \tag{17}$$

The last two parts are regarded as distortion, and defined as $\hat{R}_{p,l}{}^c$.

With a large number of subcarriers, a central limit theorem phenomenon may occur. Both the ICI-CIG and ISI components caused by transmitted data symbols may be processed as noise components.

The pilot-symbol-aided channel estimation according to the present invention is as follows. First, an initial channel coefficient value is generated by dividing the received pilot symbol $\hat{R}_{l,p}$ by the pilot symbol $D_{l,p}$ known to the reception unit.

$$\hat{H}_{l,p} = \frac{\hat{R}_{l,p}}{D_{l,p}} \tag{18}$$

Second, the initial channel coefficient values are accumulated. Thereafter, an average value is obtained by dividing the accumulated value by $L_a$, the number of OFDM symbols.

$$\overline{H}(p) = \frac{\sum_{i=0}^{L_a-1} \hat{H}_{l,p}}{L_a} \tag{19}$$

$\overline{H}(p)$ is adjusted according to the characteristic of the transmitted pilot symbol. Third, a linear interpolation is performed to estimate channel coefficients at the locations of data symbols. In a pilot symbol with a fixed value, a channel coefficient estimated at the first step is expressed by the following Equation 20.

$$\hat{H}_{l,p} = H(p) + \frac{\hat{R}_{l,p}^C}{D} \tag{20}$$

A channel coefficient estimated at the second step is as follows.

$$\overline{H}(p) = \frac{\sum_{i=0}^{L_a-1}\left(H(p) + \frac{\hat{R}_{l,p}^C}{D}\right)}{L_a} = H(p) + \frac{\sum_{i=0}^{L_a-1} \hat{R}_{l,p}^C}{L_a \cdot D} \tag{21}$$

Since $\hat{R}_{l,p}{}^c$, as shown above, is processed as a Gaussian process in which a mean value is 0, the mean value of $\hat{R}_{l,p}{}^c$ may approximate 0 with the increase of $L_a$.

$$\lim_{L_a \to \infty} \frac{\sum_{i=0}^{L_a-1} \hat{R}_{l,p}^C / D_{l,p}}{L_a} = 0 \tag{22}$$

A coefficient $\gamma_p$ is added to the resulting equation so that a resulting value is approximate to a real channel.

$$H(p) = H_1(p) + \alpha H_2(p) + \gamma_p \tag{23}$$

$$\gamma_p = \frac{1}{N_{FFT}} \sum_{t_d=0}^{N_p-G-1} \sum_{k=G+t_d+1}^{N_p-1} h_2(k) e^{-j2\pi pk/N_{FFT}}$$

$h_2(k)$ is an unknown value, so, if $h_2(k)$ is replaced by $\overline{h}_2(k)$, $\overline{h}_2(k)$ is converted to a remaining delay time within the data of an averaged channel coefficient $\overline{H}(p)$. When $\overline{H}(p)$ is IFFT-transformed and then $h_1(p)$ within the guard band interval is fixed to 0 in $h(p)$, $h_2(k)$ can be estimated. After $h_2(k)$ has been estimated, $\gamma_p$ can be obtained using a FIR filter with respect to the integration part of $h_2(k)$ in the above equation.

<Performance of Channel Estimation>

FIG. 5 shows the Bit Error Rate (BER) performance of the LMMSE method introduced to reduce noise components in the decision-directed channel estimation. A channel model was a Joint Technical Committee (JTC) channel model in which a delay time was 100 ns, and the BER performance of the LMMSE method at a transmission rate of 24 Mbps was compared to that of the LS method by averaging long training symbols. AWGN noise exists in the channel coefficient estimated by the LS method, as a result of which the ICI occurs. The noise components existing in the channel coefficient are reduced by an LMMSE block, so that a gain of about 0.9 dB can be obtained as shown in the drawing. To obtain a new channel coefficient in the decision-directed channel estimation, the received data is modulated again or passed through the coding unit. Since a Viterbi decoder has the capability to correct an error that occurs in data, the data output from the Viterbi decoder (360 of FIG. 3) are the best decision bits in an IEEE 802.11a wireless LAN.

However, to use data fed back from the result of the Viterbi decoder, it is required to allow a delay time consumed by the Viterbi decoder because the Viterbi decoder is located ahead of the descrambler of the reception unit.

FIG. 6 shows the performance of the pilot-symbol-aided channel estimation according to the number of accumulated symbols. To check the performance of the pilot-symbol-aided channel estimation according to the present invention in a system in which the ICI and ISI exist, Mean Square Error (MSE) values were compared to each other. To meet this condition, a JTC channel model, in which an RMS, having a channel condition that the maximum delay time exceeds the guard band interval, is 150 ns, was selected. As seen in the drawing, the MSE acquired by the proposed channel estimation greatly decreased with the increase of the number of symbols La accumulated as time elapsed. This shows that the MSE can decrease by accumulating and averaging the data-dependant ICI and ISI components.

FIG. 7 is a view illustrating the result of the comparison of the MSE vs. SNR according to the present invention with the MSE of the existing methods (LS and interpolation methods). When the method of the present invention is compared with the existing methods, it can be seen that a gain of about 20 dB exists in an SNR value.

In FIG. 7, the term "proposed (without adjusting)" represents a result obtained by considering both the results of the general decision-directed channel estimation and the pilot symbol-aided-channel estimation according to the present invention. In contrast, the term "proposed (with adjusting)" represents a result obtained by considering a previous signal using the LMMSE according to the preferred embodiment of the present invention while frequently adjusting the previous signal, that is, a result acquired using Equation 1 through 23. The terms are the same as those of the following drawings.

FIGS. 8a and 8b are views illustrating the results of BER comparison of the channel estimation of the present invention with the prior art in the JTC channel model in which an RMS is 100 ns. FIG. 8a shows the case in which a transmission rate is 24 Mbps, and FIG. 8b shows the case in which a transmission rate is 54 Mbps.

In the JTC channel model in which an RMS is 100 ns, the maximum delay time exceeds the guard band interval of the IEEE 802.11a wireless LAN. In this case, there was no difference whether an adjustment factor exists or not. This is because the influence of the adjustment factor on the BER is insignificant, since the maximum delay time does not exceed the guard band interval. Accordingly, the difference between the methods of the conventional art and the present invention occurs due to the LMMSE block introduced to reduce noise between the channel coefficients in the decision-directed channel estimation. The term "conventional" in FIGS. 8a and 8b represents results caused by the conventional MSE, and is the same as those of the following drawings.

FIGS. 9a and 9b are views illustrating the BER comparison results of channel estimations proposed in a JTC channel model in which an RMS is, for example, 150 ns. FIG. 9a shows the case in which a transmission rate is 24 Mbps, and FIG. 9b shows the case in which a transmission rate is 54 Mbps.

As shown in FIGS. 9a and 9b, when a channel impulse response is not effectively cancelled in an interval exceeding the guard band interval, a modulation scheme having a high transmission rate cannot have desired BER performance. In the case in which a correction coefficient does not exist in a block for accumulating and averaging the pilot symbols, the channel impulse response exceeding the guard band interval cannot be effectively eliminated, so that it can be seen that the channel impulse response converges on a specific value according to the increase of SNR.

FIG. 10 is a view illustrating the BER performance of a channel estimation applied to a time-varying channel according to a velocity in a Jakes' fading channel. In this case, a transmission rate is 24 Mbps. In FIG. 10, it can be seen that the BER is $10^{-3}$ when a velocity is 60 km/h.

As described above, the present invention can cope with the time-varying characteristics of a channel and overcome frequency selectivity using a combination of the decision-directed channel estimation and the pilot symbol-aided-channel estimation in a high-speed time-varying environment, so that remarkably precise channel coefficients can be obtained even under a variety of mobile and data transmission conditions. As a result, desired BER performance can be obtained compared to conventional channel estimation, and ICI and ISI can be reduced. Furthermore, since the receiver according to the present invention has a reconfigurable structure, it has the effects of high-speed operation and reduced power consumption.

What is claimed is:

1. A hybrid channel estimation method for an Orthogonal Frequency Division Multiplexing (OFDM) communication system, comprising the steps of:
   acquiring, from a decision-directed channel estimator of the OFDM communication system, a first channel coefficient using decision-directed channel estimation;
   acquiring, from a pilot symbol aided estimator of the OFDM communication system, a second channel coefficient using pilot-symbol-aided channel estimation; and
   calculating a final channel coefficient of a received signal by multiplying the first and second channel coefficients by first and second multiplication coefficients, respectively, and adding the multiplication results,
   wherein the second multiplication coefficient, by which the second channel coefficient acquired by the pilot-symbol-aided channel estimation is multiplied, is a constant value determined according to a constellation of the signal.

2. The hybrid channel estimation method as set forth in claim 1, wherein the step of acquiring the first channel coefficient using the decision-directed channel estimation comprises the steps of:
   acquiring an initial channel coefficient by processing a long training symbol using a Least Square (LS) technique;
   generating data by equalizing, demodulating and modulating a fast Fourier transformed new symbol using a previously estimated channel coefficient; and
   acquiring a new channel coefficient by dividing the new symbol by the data.

3. The hybrid channel estimation method as set forth in claim 2, further comprising the step of reducing noise by processing the new channel coefficient using a Linear Minimum Mean Square Error (LMMSE) technique.

4. The hybrid channel estimation method as set forth in claim 2, wherein the new channel coefficient is calculated using the previously estimated channel coefficient.

5. The hybrid channel estimation method as set forth in claim 4, further comprising the step of acquiring a channel coefficient by performing linear interpolation at a location of a data symbol of the received signal.

6. The hybrid channel estimation method as set forth in claim 1, wherein the step of acquiring the second channel coefficient using the pilot-symbol-aided channel estimation comprises the steps of:
   acquiring a channel coefficient at a location of a pilot symbol of the received signal using an LS technique; and
   acquiring a channel coefficient by processing a following pilot symbol using the LS technique, and accumulating and averaging the channel coefficient and the previously estimated channel coefficient.

7. The hybrid channel estimation method as set forth in claim 1, wherein the first multiplication coefficient, by which the first channel coefficient acquired by the decision-directed channel estimation is multiplied, is an estimated level value of the received signal.

8. The hybrid channel estimation method as set forth in claim in claim 1, wherein the value of the second multiplication coefficient is determined according to a modulation scheme for the signal.

9. A hybrid channel estimation system for an Orthogonal Frequency Division Multiplexing (OFDM) wireless communication, comprising:
   a Fast Fourier Transform (FFT) processor for performing a fast Fourier transform on a received signal;

a decision-directed channel estimator;

a pilot-symbol-aided channel estimator;

two multipliers for multiplying each output of the channel estimators by predetermined coefficients, respectively, and an adder for adding results of the two multipliers, wherein a multiplication coefficient, by which the output of the pilot-symbol-aided channel estimator is multiplied, is a constant value determined according to a constellation of the signal.

10. The hybrid channel estimation system as set forth in claim 9, wherein the decision-directed channel estimator performs the steps of:

acquiring an initial channel coefficient by processing a long training symbol using an Least Square (LS) method;

generating data by equalizing, demodulating and modulating a fast Fourier transformed new symbol using a previously channel estimated coefficient; and acquiring a new channel coefficient by dividing the new symbol by the data.

11. The hybrid channel estimation system as set forth in claim 10, wherein the decision-directed channel estimator further performs the step of reducing noise by processing the new channel coefficient using an Linear Minimum Mean Square Error (LMMSE) method.

12. The hybrid channel estimation system as set forth in claim 9, wherein the pilot-symbol-aided estimator performs the steps of:

acquiring a channel coefficient at a location of a pilot symbol of the received signal using an LS method; and acquiring a channel coefficient by processing a following pilot symbol using the Least Square (LS) method, and accumulating and averaging the channel coefficient and the previously estimated channel coefficient.

13. The hybrid channel estimation system as set forth in claim 12, wherein the pilot-symbol-aided channel estimator further performs the step of acquiring a channel coefficient by performing linear interpolation at a location of a data symbol of the received signal.

14. The hybrid channel estimation system as set forth in claim 9, further comprising a Viterbi decoder positioned to be adjacent to the decision-directed channel estimator.

15. The hybrid channel estimation system as set forth in claim 9, wherein a multiplication coefficient, by which the output of the decision-directed channel estimator is multiplied, is an estimated level value of the received signal.

16. The hybrid channel estimation system as set forth in claim 9, wherein the value of the multiplication coefficient, by which the output of the pilot-symbol-aided channel estimator is multiplied, is determined by a modulation scheme for the signal.

* * * * *